July 24, 1956  R. B. THURMAN  2,755,593
BAIT HOLDER FISHING DEVICE
Filed Oct. 16, 1953
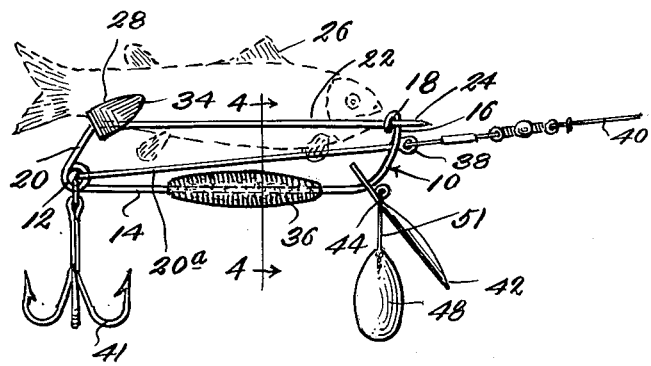
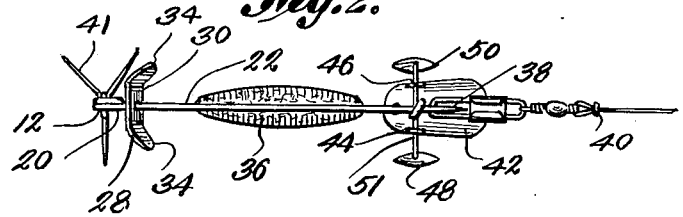
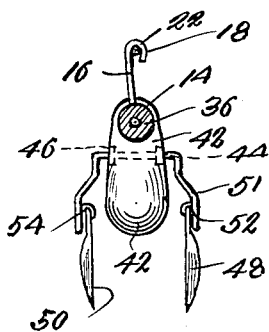
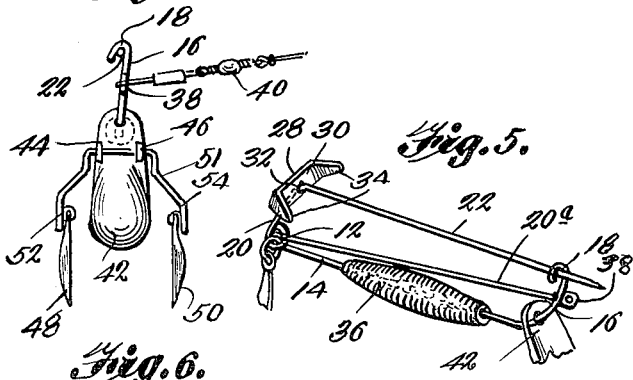
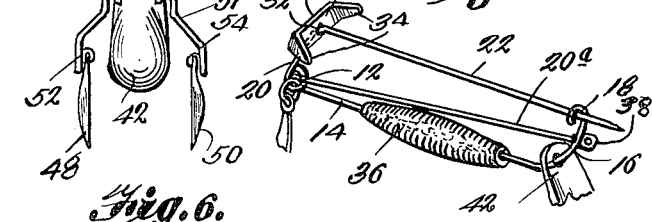
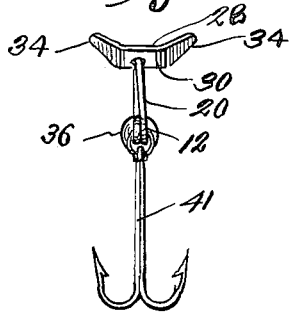
INVENTOR.
ROBERT B. THURMAN
BY
Patrick D. Beavers United States Patent Office 2,755,593
Patented July 24, 1956

2,755,593

BAIT HOLDER FISHING DEVICE

Robert B. Thurman, Sparta, Tenn.

Application October 16, 1953, Serial No. 386,485

1 Claim. (Cl. 43—44.2)

This invention relates to improvements in fishing lures and is particularly directed to an improved and novel bait holder and fish hook.

The primary object of this invention is to provide a retainer for bait which will securely hold natural bait in a natural swimming position in the water and in a secure manner to prevent its accidental dislodgement and to prevent it from being torn away.

Another object of the invention is to provide a combined bait holder or retainer and fish hook which includes a bait rig for naturally supporting natural bait and means for imparting movement to the rig as it is trolled through the water.

A further object of this invention is to provide a spring constructed bait retainer which has an arm that is releasably locked in place and is adapted to be inserted into the body of a natural bait to mount it axially thereon and to provide a saddle means for supporting a rearwardly extending portion of the bait, which portion is not attached to the arm but is seated in the saddle means.

A further object of this invention is to provide means for imparting a serpentine, swimming motion to the bait retainer and means for holding the leg and the bait thereon uppermost in the water.

It is another object of this invention to provide a simple and compact combined bait retainer, lure and fish hook, which can be inexpensively manufactured and which is durable and efficient in use.

These and ancillary objects and structural features of merit are attained by this invention, the preferred embodiment of which is set forth in the following description and illustrated in the accompanying drawing wherein:

Figure 1 is a side elevational view of the device, showing it in use;

Figure 2 is a top plan view thereof;

Figure 3 is a front elevational view thereof;

Figure 4 is a vertical cross-sectional view taken on line 4—4 of Figure 1;

Figure 5 is a view in perspective of the bait rig or retainer per se, and,

Figure 6 is a rear elevational view of the device.

Referring now more particularly to the drawing the bait rig or retainer 10 is formed from a single piece of inherently resilient wire which is bent to form a hinge loop or coil 12. The retainer includes a straight bottom portion 14 which extends from the coil and has an upstanding and forwardly inclined arm 16 that terminates in a reverted hook portion 18. An arm 20 upstands and forwardly inclines from the bottom portion 14 and is integral with the top portion 22 at its upper end. The arm depends from the straight top portion 22 which has a free end 24 that is pointed and, adjacent the end, the top portion is adapted to be latched under the hook 18 and held in parallelism with the bottom portion 14.

A natural bait, such as the minnow 26, is impaled on the top portion. Considering Figure 1, it will be noted that the minnow is sleeved on the top portion from its belly to its mouth so that it is held in an upright swimming position with the top portion extending adjacent its free end from the mouth of the minnow.

To support the tail end of the minnow which overhangs the retainer, a saddle member 28 is provided and includes a flat center portion 30 which is formed with an aperture 32. The center portion is fixedly positioned by the aperture 32 on the top portion 22 of the bait retainer in a rearwardly inclined position at the juncture of the arm 20 and top portion. The center portion has outwardly and forwardly inclined end flanges 34 that cooperate with the center portion in forming a cradle or saddle within which the tail portion of the minnow is seated.

To retain the top portion 22 of the bait retainer and the minnow or other bait thereon in an upright position, a barrel weight 36 is fixedly circumposed on the bottom portion 14. The arm 16 has a forwardly projecting eye 38 to which the line 40 is secured and a treble hook 41 swivelly depends from the loop 12. To prevent buckling, a brace rod 20a is provided (see Figure 1).

To impart motion to the device, a spoon 42 is attached at its upper minor end to the retainer at the juncture point of the bottom portion 14 and the arm 16 and extends forwardly and downwardly therefrom. The spoon has parallel apertured ears 44 and 46, which extend laterally from its side edges adjacent its minor end. The spoon gives a wobbling motion to the bait retainer and to impart an added attracting motion, a pair of spinners 48 and 50 are provided and the spinners are carried by a U-shaped holder 51 that has its web rotatably mounted in the ears 44 and 46. The spinners are attached to apertured lugs 52 and 54 which extend inwardly from the ends of the legs of the holder.

While the best known form of this invention has been disclosed herein, other forms may be realized, as come within the scope of the invention defined in the appended claim.

What is claimed is:

A bait holder composed of a single piece of wire and having a horizontally disposed lower portion, a spring loop at the rear end of said lower portion, a horizontally disposed upper portion, a dependent rear arm integrally interconnecting the rear end of said upper portion with said loop, a forward arm extending upwardly from the forward end of said lower portion, a hook formed integrally with the upper end of said forward arm and adapted to encompass the forward end of said upper portion, an upwardly extending saddle affixed to the rear end of said upper portion, and a weight centrally affixed to said lower portion.

References Cited in the file of this patent

UNITED STATES PATENTS

| 843,651 | Willing | Feb. 12, 1907 |
| 852,793 | Ladish | May 7, 1907 |
| 1,025,695 | Gibson | May 7, 1912 |
| 1,258,213 | Grothkopf | Mar. 5, 1918 |
| 2,228,591 | Brown | Jan. 14, 1941 |
| 2,330,517 | Rigandi | Sept. 28, 1943 |
| 2,533,390 | Miller | Dec. 12, 1950 |
| 2,573,018 | Herrick | Oct. 30, 1951 |
| 2,618,096 | Wagner | Nov. 18, 1952 |

FOREIGN PATENTS

| 741,382 | France | Dec. 3, 1932 |
| 802,293 | France | June 6, 1936 |